Figure 5:
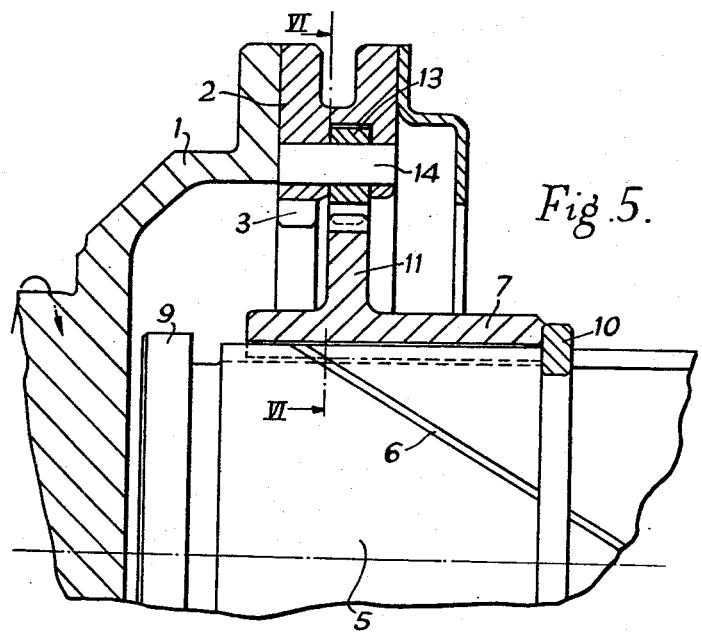

Nov. 14, 1961 — P. J. SHORT — 3,008,560
SELF-SHIFTING SYNCHRONIZING CLUTCHES
Filed March 26, 1959 — 2 Sheets-Sheet 1
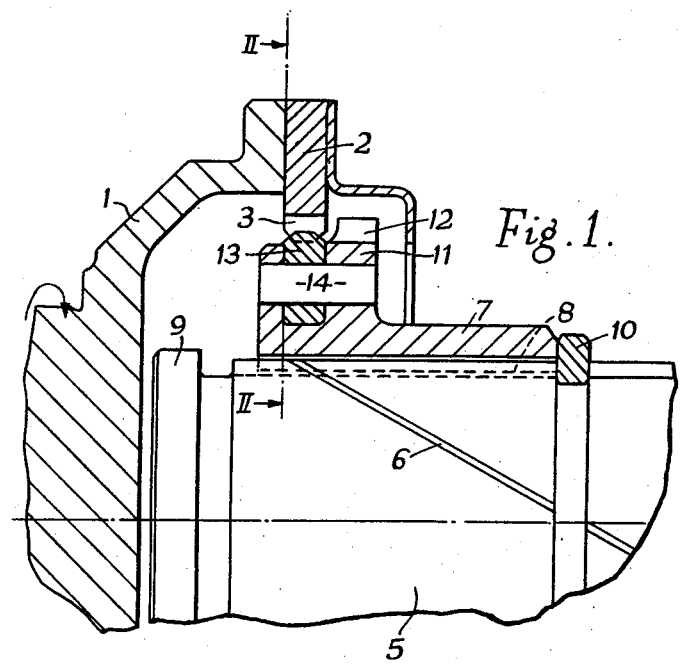
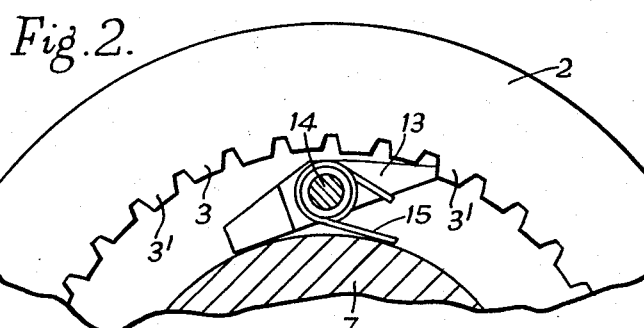
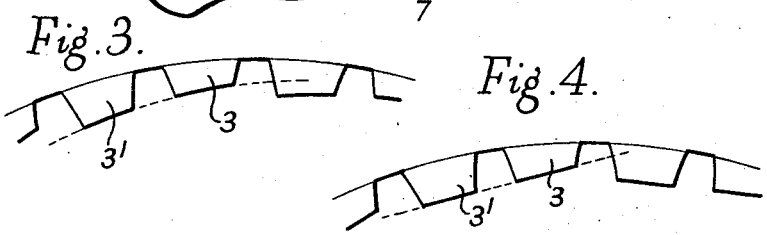
INVENTOR
Philip John Short
BY
Benjamin Sweedler
ATTORNEY Nov. 14, 1961 P. J. SHORT 3,008,560
SELF-SHIFTING SYNCHRONIZING CLUTCHES
Filed March 26, 1959 2 Sheets-Sheet 2

INVENTOR
Philip John Short
BY
Benjamin Sweedler
ATTORNEY

United States Patent Office 3,008,560
Patented Nov. 14, 1961

3,008,560
SELF-SHIFTING SYNCHRONIZING CLUTCHES
Philip John Short, Wokingham, England, assignor to S.S.S. Gears Limited, Isleworth, England, a British company
Filed Mar. 26, 1959, Ser. No. 802,126
Claims priority, application Great Britain Apr. 2, 1958
1 Claim. (Cl. 192—67)

This invention relates to self-shifting synchronizing clutches of the type comprising a first rotary clutch member provided with jaw clutch teeth, a second rotary clutch member, and an intermediate member provided with jaw clutch teeth and constrained for limited helical movement relative to said second clutch member for bringing the clutch teeth of the intermediate member into and out of engagement with the clutch teeth of the first clutch member, ratchet drive being provided for initiating such engagement when the first and second clutch members have relative angular movement in the appropriate direction.

In some cases, the ratchet drive includes pawls carried by one of said first and intermediate members, and a ring of ratchet teeth carried by the other of said members. It has generally been the practice for the clutch teeth on the said other member to be used also as the ratchet teeth, in which the ratchet/clutch teeth have been of conventional involute form, the tops or crowns of which lie on a circumference and the two sides of each tooth being similar and symmetrical in form with respect to a radial plane of the coupling passing through the axis of rotation and the centre of the tooth. In general, so as to give an easier ratchetting action of the pawls over or under the teeth at the higher speeds of relative rotation, the pawls have been arranged to cooperate with only some of the said clutch teeth, those clutch teeth which serve also as ratchet teeth being radially longer than the other clutch teeth. For example, every second clutch tooth may be radially longer than the other teeth, when two pairs of radially opposite pawls are used, and with this arrangement the pairs of pawls are pitched in correct relationship with each other such that when the tips of one pair are in contact with the coacting faces of a pair of radially opposite long teeth, the tips of the other pair are in a position midway between the coacting faces of adjacent pairs of long teeth. On the other hand every third clutch tooth may be radially longer than the intermediate teeth when three pairs of radially opposite pawls are used in correctly pitched pairs to engage sequentially with the said longer teeth. In all these cases, however, the long ratchet teeth have all been similar and symmetrical in form, as have also been the radially short intermediate teeth. Nevertheless, at the higher relative speeds the ratchetting action is not as smooth as is desired.

The ratchet teeth have also all been similar in cases where they are distinct from the clutch teeth, for example where a separate ratchet ring with specially formed teeth suitable for smoother ratchetting is provided, and which comprises ratchet teeth which have circumferentially long flanks along with the pawls may slide when the clutch is in the free-wheeling condition and short radial flanks against which one or both of a radially oppositely positioned pair of pawls abut when the relative rotation of the clutch members is reversed. The ratchet teeth in these cases are similarly directed and in each of them the long flank occupies a considerably greater circumferential length than the corresponding length of clutch teeth in those earlier designs of clutch wherein the clutch teeth also serve as ratchet teeth.

The use of separate rings with ratchet teeth having long and short flanks as above described has been found to be advantageous in reducing noise and tendency to wear, where long periods of ratchetting at high speed are involved, but in some cases it is not possible, due to limitations on the length of the clutch, to employ a separate ratchet ring, and in such cases the clutch teeth have also to serve as ratchet teeth and the symmetrical form of the clutch teeth is not the most suitable for giving the desired smooth ratchetting action of the pawls thereon. The object of the present invention is to provide an improvement in this respect, and in accordance with the invention, in a clutch of the type first referred to herein the clutch teeth of one of said first and intermediate members serve as ratchet teeth and form a recurring series of separate teeth with crowns which over at least part of their axial width conform to a flat or preferably curved surface that, considered in one direction of rotation is spaced progressively further from the root circle of the teeth.

The invention may be applied to clutches in which the said teeth are internal teeth with which the pawls engage radially outwards, or external teeth with which the pawls engage radially inwards.

Figure 6:
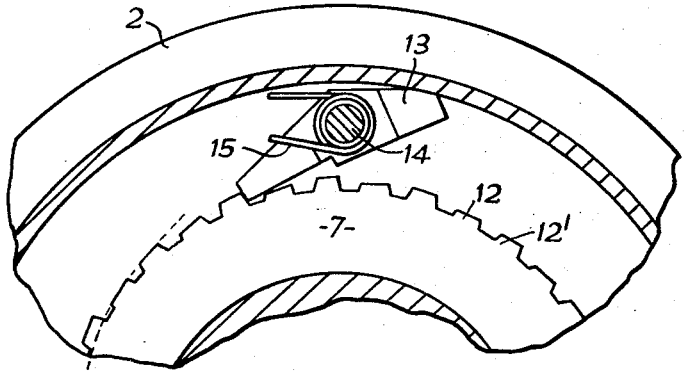

In order that the invention may be clearly understood and readily carried into effect it will now be described in more detail with reference to the accompanying drawings, in which FIG. 1 is a view in longitudinal section of a clutch embodying the invention in which the pawls cooperate with internal clutch teeth, FIG. 2 is a section on the line II—II of FIG. 1, FIG. 3 shows part of FIG. 2 on a larger scale, FIG. 4 shows a modification of the clutch teeth of the clutch shown in FIGS. 1 to 3, on the same scale as FIG. 3, FIG. 5 is a view in longitudinal section of a clutch embodying the invention in which the pawls cooperate with external clutch teeth, and FIG. 6 is a section on the line VI—VI of FIG. 4.

Referring to FIGS. 1 to 3, the clutch illustrated comprises a first clutch member 1 to which is fixed a ring 2 formed with internal clutch teeth 3, 3' which also serve as ratchet teeth. As shown in FIG. 2, the teeth 3, 3' form a recurring series of two clutch teeth. One tooth 3' of each series is radially longer than the other tooth 3, and the crowns of the two clutch teeth 3 and 3' of each series conform to a curved surface (shown by the dotted line in FIG. 3) that recedes progressively from the radially short tooth 3 to the radially long tooth 3', as is more clearly shown in the larger scale and exaggerated in FIG. 3. In effect, therefore, each series of two clutch teeth 3', 3 forms an interrupted elongated ratchet tooth having a long flank represented by the crowns of the two teeth and a short flank represented by that side of the radially long tooth 3' that is remote from the radially short tooth 3.

If desired, the crowns of each series of two teeth may conform to a plane surface as shown by the dotted line in FIG. 4, instead of a curved surface as shown by the dotted line in FIG. 3.

The second clutch member is a shaft 5 provided with external helical splines indicated conventionally at 6, and an intermediate member 7 is mounted on shaft 5, being provided with internal helical splines 8 engaged with the splines 6, so that the intermediate member 7 is constrained to move helically relative to the shaft 5, its movement being limited by stops 9 and 10 on the shaft. The intermediate member 7 is formed with a radial flange 11 which carries a ring of clutch teeth 12 and which has an annular groove in which are disposed pawls one of which is shown at 13. There may be say four pawls arranged in two diametrically opposite pairs. The pawls 13 are mounted on pawl pins 14 which project through the flange 11, and are provided with control springs 15. The noses of the pawls point in clockwise direction as viewed from the left hand side of the clutch, as shown in FIG. 2.

FIG. 1 shows the clutch in the disengaged condition in which the intermediate member 7 is against the stop 10 and its clutch teeth 12 are disengaged from the clutch teeth 3 and 3'.

Assuming that the shaft 5 is rotating in anticlockwise direction (FIG. 2) relative to the clutch member 1, the pawls 13 ratchet past the clutch teeth 3 and 3'. If the direction of relative motion of the clutch parts 1 and 5 tends to reverse, as for example due to the clutch member 1 being accelerated in anti-clockwise direction so as to overtake the shaft 5, a pawl (or a pair of diametrically opposite pawls) engages the short flank of a ratchet tooth, viz. the side of a long tooth 3', as shown in FIG. 2, and the intermediate member 7 is moved helically along the shaft 5 so as to engage its clutch teeth 12 with the clutch teeth 3 and 3', being prevented from moving beyond the position of full toothed engagement by coming up against the stop 9. Upon reversal of the direction of relative movement of the clutch parts 1 and 5 the interaction of the clutch teeth causes the intermediate member 7 to move out of toothed engagement with the clutch part 1 against the stop 10 whereupon the pawls 12 resume their ratchetting action.

Referring now to FIGS. 5 and 6, the first clutch member 1 has fixed to it a ring 2 which is formed with internal clutch teeth 3 and with an annular groove in which are disposed a plurality of pawls 13 mounted on pawl pins 14 and provided with control springs 15. The intermediate member 7 is formed with a radial flange 11 on the periphery of which are formed clutch teeth 12 and 12'. In this case the noses of the pawls 13 point in anti-clockwise direction as viewed from the left-hand side of FIG. 5 as is shown in FIG. 6.

The external clutch teeth 12 and 12' on the intermediate member 7 serve also as ratchet teeth that cooperate with the pawls 13 carried by the first clutch member 1, and they are arranged, as shown in FIG. 6, in a recurring series which has two clutch teeth 12 and 12'. The tooth 12' of each series is radially longer than the tooth 12 and the crowns of the two teeth 12 and 12' conform to a curve surface (indicated by the dotted line in FIG. 6) that recedes progressively from the root circle of the teeth in the clockwise direction as seen in FIG. 6. Thus in effect each series of two clutch teeth 12, 12' forms an interrupted elongated ratchet tooth that has a long flank represented by the crowns of the two teeth and a short flank represented by that side of the radially long tooth 12' which is remote from the short tooth 12. In this case also the crowns of each series of two teeth may if desired conform to a plane surface.

The operation is similar to that of the clutch described with reference to FIGS. 1 to 3. So long as the shaft 5 is rotating in anti-clockwise direction, as seen from the left in FIG. 5, faster than the clutch member 1 the clutch teeth 12 and 12' ratchet past the pawls 13. If the direction of relative rotation tends to reverse, as by the clutch member 1 overtaking the shaft 5, a pawl (or a pair of diametrically opposite pawls) engages the short flank of a ratchet tooth, as in FIG. 6, and shifts the intermediate member 7 helically along the shaft 5 from the disengaged position shown in FIG. 5 to the engaged position in which the clutch teeth 12 and 12' are fully engaged with the clutch teeth 3. Upon reversal of the direction of relative rotation of the clutch members 1 and 5 the clutch disengages by movement of the intermediate member 7 to the right in FIG. 5 up to the stop 10, whereupon the pawls 13 resume their ratchetting action.

In another embodiment of the invention (not illustrated) external clutch teeth on the first clutch member cooperate with inwardly directed pawls carried by the intermediate member. In a further embodiment of the invention (not illustrated) internal clutch teeth in the intermediate member cooperate with outwardly directed pawls carried by the first clutch member.

I claim:

A self-shifting synchronous clutch of the type comprising a first rotary clutch member provided with jaw clutch teeth, a second rotary clutch member and an intermediate member provided with jaw clutch teeth, means constraining said intermediate member for limited helical movement relative to said second clutch member, said helical movement serving to bring the clutch teeth of the intermediate member into and out of engagement with the clutch teeth of the first clutch member according to the direction of said helical movement, and a ratchet drive for initiating said engagement when the first and second clutch members have relative angular movement in one direction, the said ratchet drive comprising pawls and ratchet teeth, said pawls being carried by one of the said first and intermediate members, and said ratchet teeth being formed by teeth on the other of said first and intermediate members, the last-mentioned teeth each having two flanks and a crown and forming a recurring series of separate teeth, the crowns of each series of teeth conforming over at least a part of their width to a surface that, considered in one direction of rotation, is spaced progressively further from the root circle of the said teeth.

References Cited in the file of this patent
UNITED STATES PATENTS 2,443,597     Carnagua et al. _____ June 22, 1948
2,651,394     Sinclair _____ Sept. 8, 1953